(12) United States Patent
Dean

(10) Patent No.: US 6,343,668 B1
(45) Date of Patent: Feb. 5, 2002

(54) FOLDABLE CONTROL LEVER

(75) Inventor: Jimmy Clark Dean, Dewey, OK (US)

(73) Assignee: Dixon Industries, Inc., Coffeyville, KS (US)

(*) Notice: Subject to any disclaimer, the term of this patent is extended or adjusted under 35 U.S.C. 154(b) by 0 days.

(21) Appl. No.: 09/521,075

(22) Filed: Mar. 7, 2000

(51) Int. Cl.$^7$ .................. B60K 26/00; A01D 69/10; G05G 1/00; F16C 11/00
(52) U.S. Cl. ................. 180/315; 56/11.3; 74/547; 403/93
(58) Field of Search .................. 180/315; 56/11.3, 56/10.8, 16.7; 74/547; 403/93, 94, 96

(56) References Cited

U.S. PATENT DOCUMENTS

| | | | | |
|---|---|---|---|---|
| 1,743,241 A | * | 1/1930 | Schmidt | 74/547 |
| 1,908,423 A | * | 5/1933 | Hjermstad | 74/547 |
| 2,803,937 A | * | 8/1957 | Etzelt | 56/16.7 |
| 3,229,452 A | * | 1/1966 | Hasenbank | 56/11.3 |
| 4,645,224 A | * | 2/1987 | Poganski | 403/93 |
| 5,337,543 A | * | 8/1994 | Kitamura et al. | 56/10.8 |
| 5,496,226 A | * | 3/1996 | Splittstoesser et al. | 476/24 |
| 5,513,544 A | * | 5/1996 | Winkler et al. | 74/547 |
| 5,816,033 A | * | 10/1998 | Busboom et al. | 56/108 |
| 5,822,961 A | * | 10/1998 | Busboom | 56/10.8 |
| 5,946,894 A | * | 9/1999 | Eavenson et al. | 56/16.7 |
| 6,029,535 A | * | 2/2000 | Kenny et al. | 74/473.3 |
| 6,056,074 A | * | 5/2000 | Heal et al. | 180/6.48 |

* cited by examiner

Primary Examiner—Brian L. Johnson
Assistant Examiner—Joselynn Y. Sliteris
(74) Attorney, Agent, or Firm—Brinks Hofer Gilson & Lione

(57) ABSTRACT

A foldable control lever for use with a riding mower comprising a main lever tube having a lower end, an upright section and a grip portion. An upper weldment is affixed to the lower end of the main lever tube. The upper weldment comprises a support flange and a plurality of outwardly projecting ears. A lower weldment connected to the mower drive unit is adapted to receive the lower end of the main lever tube. The lower weldment comprises a receiver flange having a plurality of notches spaced about the circumference of the flange. The notches are configured so as to engage the outwardly projecting ears of the upper weldment. When the outwardly projecting ears are engaged with the notches, the main lever tube is prevented from rotating relative to the lower weldment. When the outwardly projecting ears are not engaged with the notches, the main lever tube can be rotated downward and on to the top of the mower.

9 Claims, 3 Drawing Sheets

FOLDABLE CONTROL LEVER

FIELD OF THE INVENTION

This invention relates generally to the field of riding mowers and, in particular, to a control lever that can be folded or collapsed to permit improved entry to or exit from the operator's seat of a riding mower.

BACKGROUND OF THE INVENTION

Riding lawn mowers are used to cut grass and the like and are manufactured in various designs and configurations. Certain elements, however, are common to most riding lawn mowers. For example, a riding lawn mower typically includes a frame supported by three or more wheels. A mower deck comprising one or more rotating cutting blades is normally suspended beneath the frame and in close proximity to the ground. Rotation of the cutting blades is usually provided by a power plant such as a gasoline engine. The power plant also provides the driving force for the wheels.

An operator controls the various mechanical operations of the riding lawn mower. In many riding lawn mower designs, the operator is seated on top of the mower. From this position, the operator can control the speed and direction of the mower, as well as the operation of the mower deck.

One particular design for a riding lawn mower is disclosed in U.S. Pat. No. 5,496,226, which is hereby incorporated by reference. As set forth therein, the riding lawn mower comprises a pair of hand levers that engage a transmission assembly. Fore and aft movement of the hand levers alters the rotational speed of the drive wheels, thereby changing the direction of the riding mower. In other words, the riding mower is steered by manipulation of the hand levers.

The hand levers of this design are positioned so that they can be easily grasped and manipulated by the operator from the seated riding position. In particular, the hand levers are each "C"-shaped and extend from a connection point beneath and along each side of the operator's seat. The middle portion of the hand levers extend upwards on either side of the operator's legs. The upper portion of the hand levers extend horizontally towards each other (through a 90 degrees bend) and in front of the operator's upper body (i.e., above the operator's lap). This configuration allows the operator to easily and comfortably grasp and manipulate the hand levers from the seated position on top of the riding mower.

The configuration for the hand levers of the above-described design has a number of disadvantages. For example, the hand levers can impede entry to or exit from the operator's seat. To gain entry to the operator's seat, the operator ordinarily has to swing one of the hand levers to the outwardly from the side of the mower. Alternatively, the operator may push one of the hand levers to the rear while pulling the other hand lever towards the front. Either procedure spreads the hand levers apart so that operator can maneuver between the ends of the hand levers and sit down on the operator's seat. These procedures, however, may be difficult to perform and may fail to provide sufficient clearance for many operators.

One attempt to solve this problem is to allow the hand levers to swing outwardly towards the sides of the mower. Swinging the hand levers to side of the mower, however, may still not provide sufficient access to the mower for some operators. This is because the hand levers will remain adjacent to the side of the operator's seat. The position of the hand levers may consequently inhibit the ability of some operators, particularly elderly or handicapped operators, to gain entry to the operator's seat.

Accordingly, it would be desirable to provide a control lever arrangement that overcomes the disadvantages and limitations described above.

BRIEF SUMMARY OF THE INVENTION

The foldable control lever of the present invention comprises a main lever tube having a lower end, an upright section and a grip portion. The upright section connects the grip portion to the lower portion. An upper weldment is affixed to the lower end of the main lever tube. The upper weldment comprises a support flange and a plurality of outwardly projecting ears.

The foldable control lever is supported by a lower weldment adapted to receive the lower end of the main lever tube. The lower weldment is connected to the transmission assembly and transmits the movement of the control lever to the drive unit of the mower. The lower weldment comprises a receiver flange having a plurality of notches spaced about the circumference of the flange. The notches are configured so as to engage the outwardly projecting ears of the upper weldment. When the outwardly projecting ears are engaged with said notches, the main lever tube is prevented from rotating relative to the lower weldment. This allows the control lever to be used to operate the drive unit. When the outwardly projecting ears are not engaged with the notches, the main lever tube can be rotated downward and on to the top of the mower. This allows the control lever to be folded out of the way of the operator, thereby providing increased access to the operator's seat.

The preferred embodiment of the invention includes features in addition to those listed above. Moreover, the advantages over the current art discussed above are directly applicable to the preferred embodiment, but are not exclusive. The other features and advantages of the present invention will be further understood and appreciated when considered in relation to the detailed description of the preferred embodiment.

DETAILED DESCRIPTION OF THE INVENTION

Figure 1:
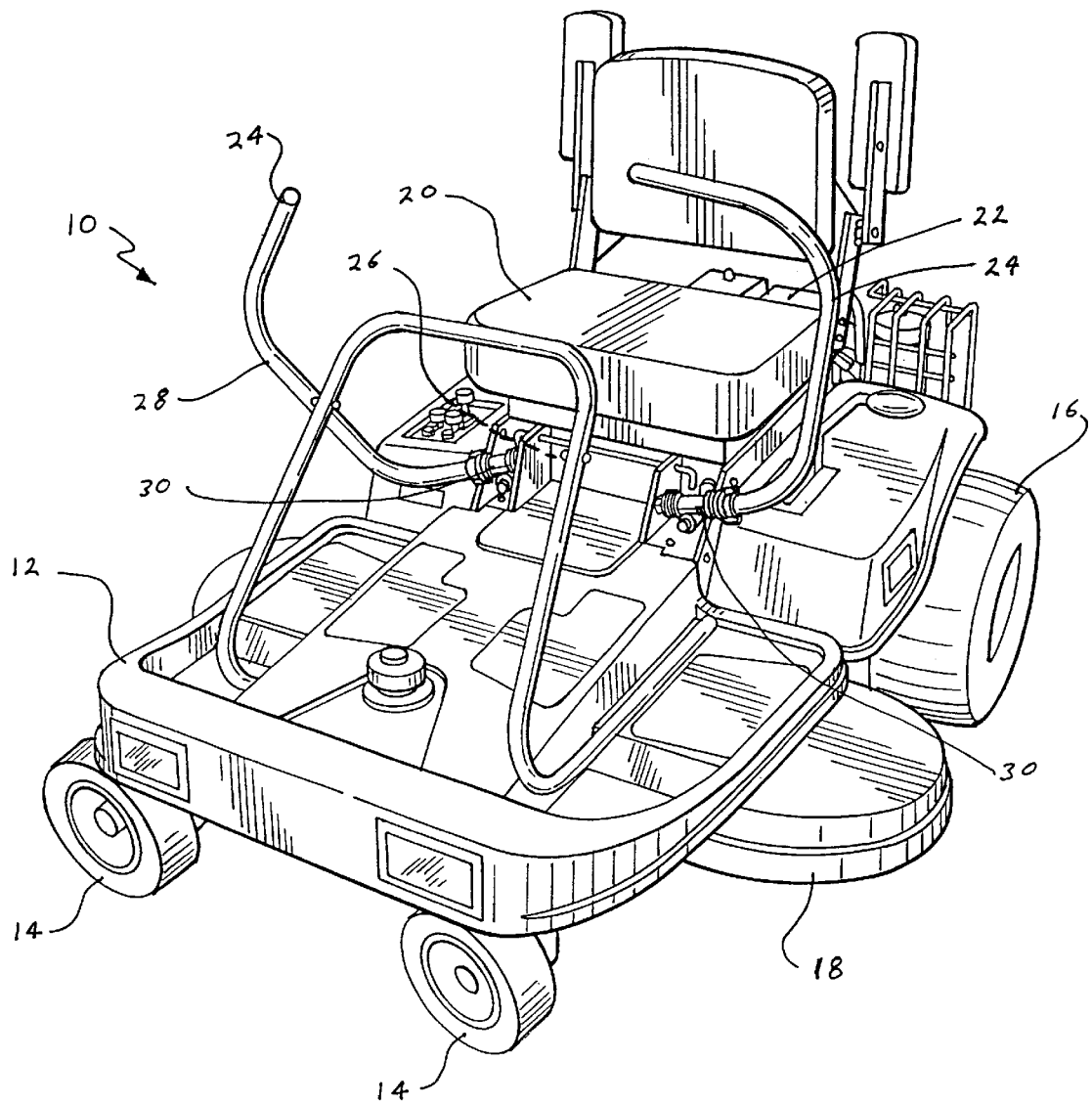
FIG. 1 is a perspective view of a riding mower incorporating foldable control levers of the present invention.

While the present invention will find application in all types of riding machinery, the preferred embodiment of the invention is described in conjunction with the riding lawn mower 10 of FIG. 1. The riding lawn mower 10 comprises a frame 12 supported on two pairs of wheels 14, 16, a mower deck 18 suspended from the frame, a seat 20 for the operator, and an engine 22. The mower also comprises a pair of control levers 24 for operating a transmission drive 26 connected between the engine 22 and each of the rear pair of wheels 16.

The mower deck 18 includes a pair of cutting blades (not shown) rotatably supported beneath the upper surface of the mower deck 18. The engine 22 of the mower 10 provides the rotational force to the cutting blades through a belt and pulley arrangement (not shown). A clutch mechanism is also provided between the engine and the cutting blades. The clutch mechanism (not shown) allows the cutting blades to be disengaged from the engine 22. The design and function of mower cutting blades is well known to those skilled in the art.

The two front wheels 14 are pivotally mounted to the forward end of the frame 12. The pivotal connection allows the axis of each of the front wheels 14 to rotate (i.e., turn) 360 degrees relative to the frame 12. The two rear wheels 16 are connected to the engine 22 by a transmission drive 26. No steering wheel is provided since the direction of the mower 10 is controlled by altering the rotational speed of the rear wheels 16. In other words, the mower 10 is turned towards one side or the other by slowing the speed of one of the rear wheels 16 relative to the other.

The rotational speed of the rear wheels 16 is controlled by the transmission drive 26 of the mower 10. The transmission drive 26 includes a variable speed friction unit mounted beneath the operator's seat 20 and forward of the engine 22. The friction unit provides a means for independently controlling the rotational speed of each rear wheel 16. Altering the rotational speed of one of the rear wheels 16 relative to the other causes the mower 10 to change direction. For example, reducing the speed of the left rear wheel 16 relative to the right rear wheel 16 will cause the mower 10 to turn towards the left. The design and function of the transmission drive 26 of the preferred embodiment is set forth in detail in U.S. Pat. No. 5,496,226, which is hereby incorporated by reference. Other aspects of the design and function of the mower 10 of the preferred embodiment are also disclosed in the above-referenced patent.

The operation of the transmission drive 26 is controlled by the control levers 24. As best seen in FIG. 1, each control lever 24 comprises a generally "C"-shaped round stock or tubular member 28. The lower end 30 of each control lever is connected to an input member 32 on the transmission drive (see FIG. 5). Movement of the input member 32 controls the operation of the transmission drive 26. For example, an upward movement of the input member 32 on the left side of the mower reduces the rotational speed of the left rear wheel 16 (relative to the rotational speed of the right rear wheel 16). As will be described in detail below, upward movement of the input member 32 is accomplished by pulling the control arm 24 towards the rear of the mower 10.

Figure 2:
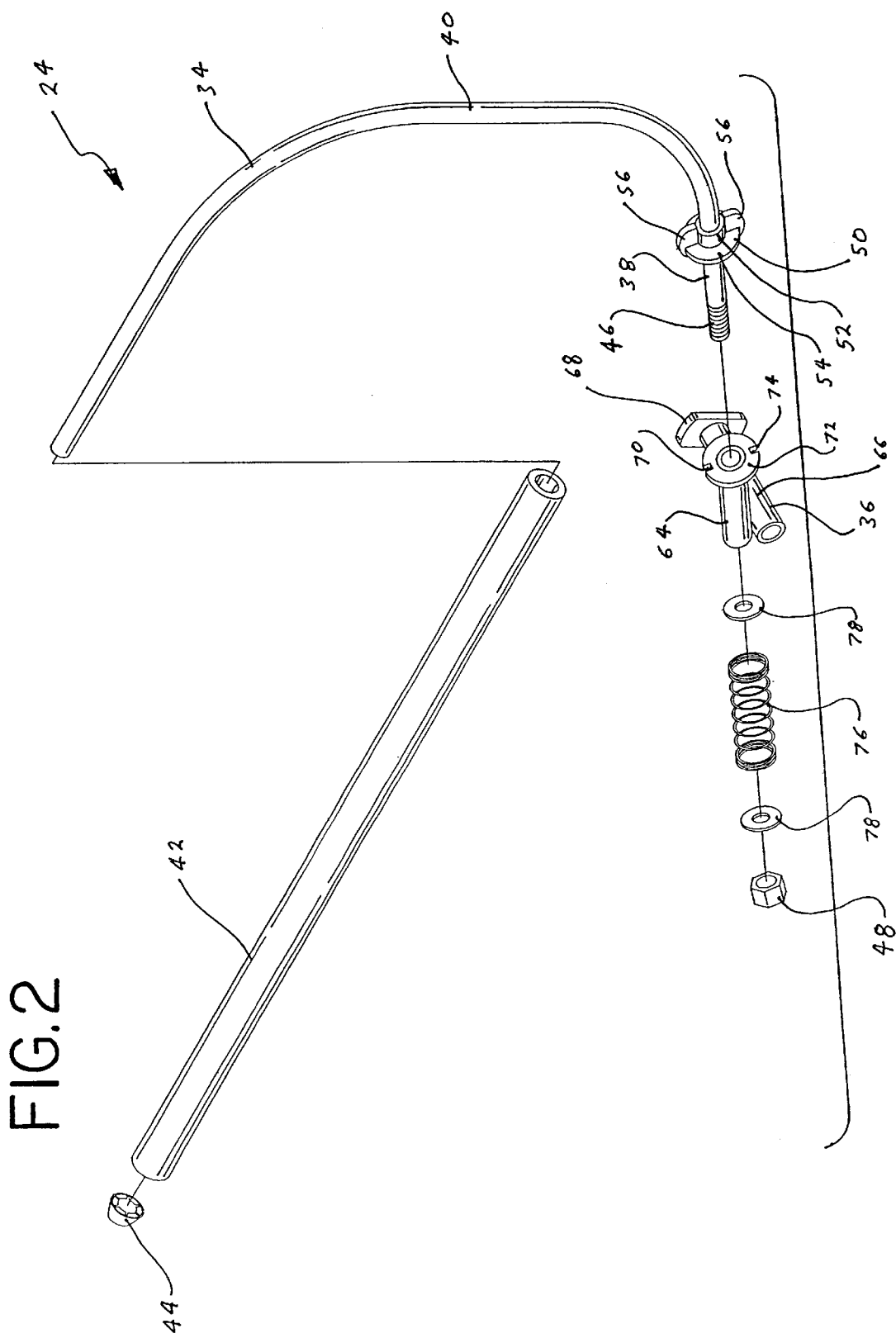
FIG. 2 is an exploded view of a foldable control lever of the present invention.

As best seen in FIG. 2, each control arm 24 comprises a main lever tube 34 supported by a lower weldment 36. The main lever tube 34 is generally "C"-shaped and comprises a lower leg 38, an upright section 40, and a grip portion 42. The lower leg 38 is connected to the lower weldment 36 at a location below the operator's seat 20 and extends upwardly and outwardly towards the side of the mower 10 (see FIG. 1). The upright section 40 extends upwards along the side of the mower 10 (i.e., outside the operator's legs). The grip portion 42 generally extends horizontally from the upper end of the upright section 40 and terminates near the centerline of the mower 10.

As best seen in FIG. 1, the operating position of the grip portion 42 is in above and forward of the operator's seat 20. This places the grip portion 42 of each control arm 24 in front of the operator's upper body and above the operator's lap. An end cap 44 is placed over the end of the grip portion 42 to prevent rain or the like from entering the grip portion 42 of the main lever tube 34 and to protect the operator from any sharp edges or burrs that may exist on the end of the main lever tube 34. The main lever tube 34 of the preferred embodiment is manufactured from a tubular metal that has been bent to form the preferred shape.

Figure 8:
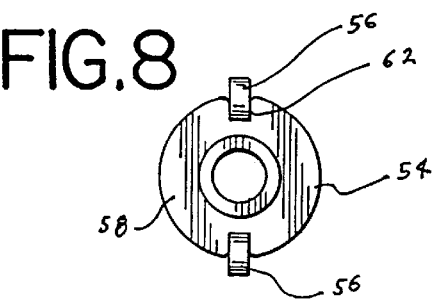
FIG. 8 is a detailed view of the end of the upper weldment of the foldable control lever of the present invention.

As best seen in FIG. 2, the lower leg 38 of the main lever tube 34 terminates with a threaded section 46. As will be discussed in greater detail below in connection with the description of the lower weldment 36, the threaded section 46 engages a retaining nut 48. An upper weldment 50 is affixed to the lower leg 38 inwardly from the threaded section 46. The upper weldment 50 comprises a collar 52, a support flange 54, and a pair of locking ears 56. The collar 52 is affixed to the lower leg 38 of the main lever tube 34 by one or more welds (not shown). As best seen in FIGS. 4–6 and 8, the support flange 54 extends perpendicularly from one end of the collar 52. In particular, the exterior face 58 of the support flange 54 is aligned with the lower end (the left end in FIGS. 4 and 6) of the collar 52 to form a single plane. The locking ears 56 are located on opposite sides of the collar 52 and project past the exterior face 58 of the support flange 54. The ends of the locking ears 56 are inward from the outer diameter or circumference of the support flange 54. The locking ears 56 also project past the interior face 60 of the support flange 54 and are secured to the exterior surface of the collar 52. As best seen in FIG. 8, the flange includes notches 62 through which the locking ears 56 project. These notches 62 secure the locking ears 56 against lateral movement. In the preferred embodiment shown, the collar 52, the support flange 54, and the pair of locking ears 56 are each manufactured from separate metal components and welded together to form the upper weldment 50. In the alternative, these components could be machined or cast as a single monolithic element.

The lower leg 38 of the main lever tube 34 is supported by the lower weldment 36. As best seen in FIGS. 2 and 4–6, the lower weldment 36 comprises a sleeve 64 welded to a mounting tube 66. The mounting tube 66 includes a mounting flange 68 that is connected to the input member 32 of the transmission drive 26. The connection between the mounting flange 68 and the input member 32 may be made pivotal. A pivotal connection would permit the lower weldment 36 to rotate relative to the input member 32, thereby allowing the control lever 24 to be swung outwardly towards the side of the mower 10 (as shown with respect to the right control lever 24 in FIG. 1).

Figure 7:
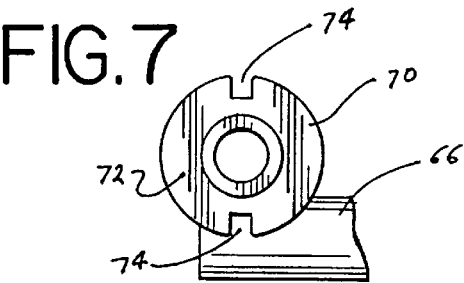
FIG. 7 is a detailed view of the end of the lower weldment of the foldable control lever of the present invention.
Figure 4:
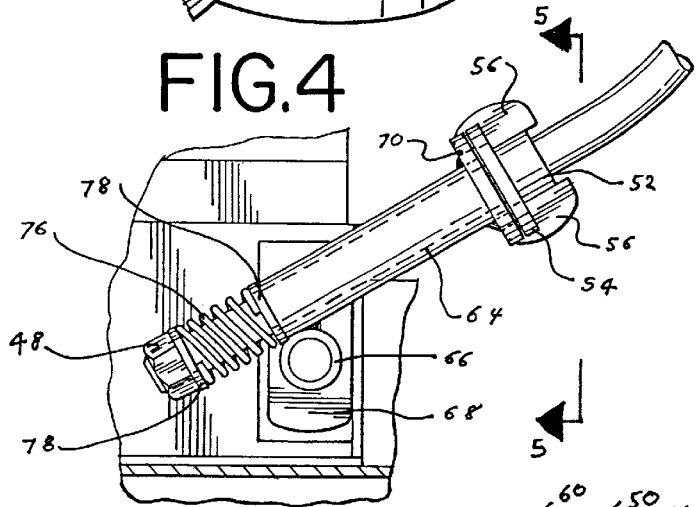
FIG. 4 is a front view of the lower portion of the foldable control lever of the present invention showing the foldable control lever in the operating position.
Figure 5:
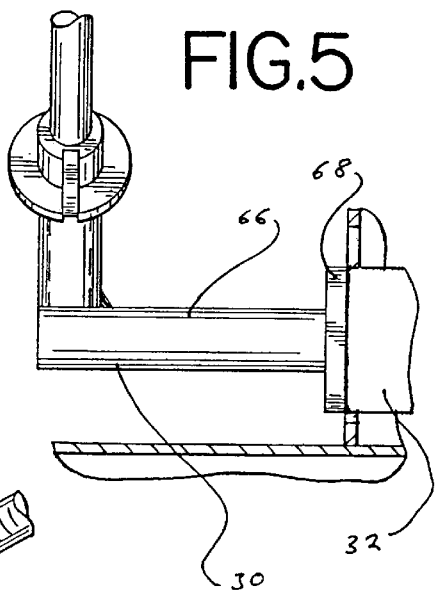
FIG. 5 is a right-side view of the lower portion of the foldable control lever of the present invention taken along line 5—5 of FIG. 4.
Figure 6:
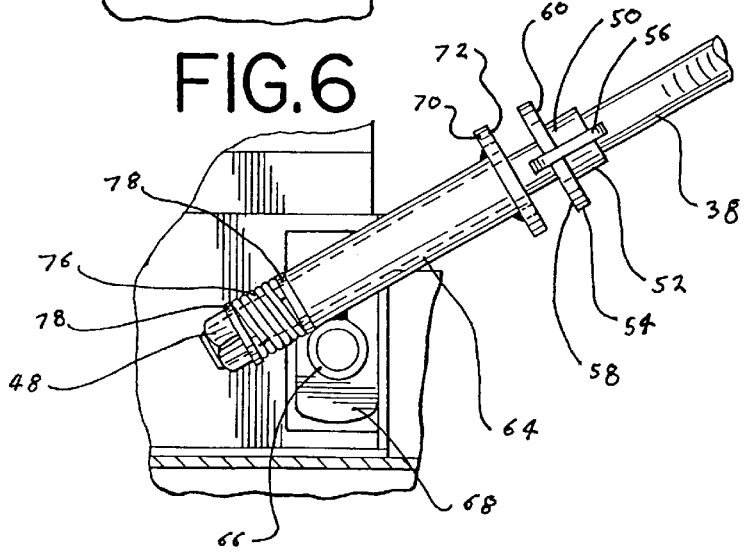
FIG. 6 is a front view of the lower portion of the foldable control lever of the present invention showing the foldable control lever in the folded or collapsed position.

As best seen in FIGS. 4–6, the sleeve 64 is welded to the mounting tube 66 at a generally perpendicular angle. The size and shape of the sleeve 64 is designed to fit over the lower leg 38 of the main lever tube 34. In the preferred embodiment shown, inside diameter of the sleeve 64 is slightly larger than the outside diameter of the lower leg 38. This allows the sleeve 64 to freely rotate and/or translate on the lower leg 38. A receiver flange 70 is connected to one end of the sleeve 64. As best seen in FIG. 6, the exterior face 72 of the receiver flange 70 is aligned with the upper end (the right end in FIG. 6) of the sleeve 64 to form a single plane. In the preferred embodiment shown, the receiver flange 70 has a diameter that equals the diameter of the support flange 54 of the upper weldment 50. As best seen in FIG. 7, the receiver flange 70 comprises a pair of notches 74 on opposite sides that are configured so as to engage the locking ears 56 of the upper weldment 50. In the preferred embodiment shown, the various components of the lower weldment 36 are manufactured separately and welded together. In the alternative, these components could be machined or cast as a single monolithic element.

As best seen in FIGS. 4–6, the control arm 24 is connected to the input member 32 of the transmission drive 26 by the insertion of the lower leg 38 through the sleeve 64 of the lower weldment 36. The lower leg 38 extends past the lower end of the sleeve 64. A retaining nut 48 engages the threaded portion 46 of the lower leg 38. A spring 76 is positioned over the lower leg 38 between the retaining nut 48 and the lower end of the sleeve 64. A flat washer 78 is positioned at each end of the spring 76 so as to confine the spring 76 between the retaining nut 48 and the lower end of the sleeve 64. The spring 76 biases the upper weldment 50 against the lower weldment 36.

FIG. 4 shows the control arm 24 in the engaged position. In this position, the locking ears 56 of the upper weldment 50 are engaged with the notches 74 on the receiver flange 70 and the exterior face 58 of the support flange 54 is pressed against the exterior face 72 of the receiver flange 70. These components are held in this position by the spring 76, which biases the upper weldment 50 against the lower weldment 36. The engagement of the locking ears 56 in the notches 74 on the receiver flange 70 prevents the upper weldment 50 from rotating relative to the lower weldment 36. This results in a rigid connection between the control arm 24 and the input member 32, thereby enabling the control arm 24 to be used to operate the transmission drive 26. In other words, pulling back on the control arm 24 will cause upward movement in the input member 32 and, consequently, a reduction in the rotational speed of the rear wheel 16.

Figure 3:
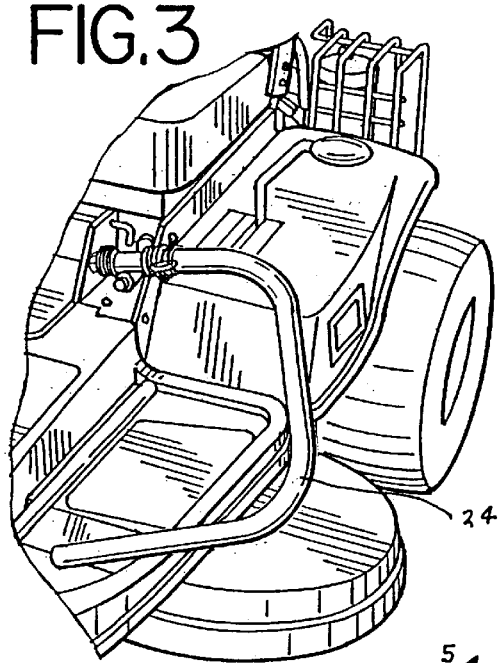
FIG. 3 is a partial perspective view of the riding mower of FIG. 1 showing the foldable control lever of the present invention in the folded or collapsed position.

FIGS. 3 and 6 shows the control arm 24 in the disengaged position. Applying an outward force on the main lever tube 34 sufficient to compress the spring 76 disengages the control arm 24. As the spring 76 is compressed, the lower leg 38 slides through the sleeve 64 thereby allowing the upper weldment 50 to separate from the lower weldment 36. The upper weldment 50 is moved a distance sufficient to disengage the locking ears 56 from the notches 74 on the receiver flange 70. With the locking ears 56 disengaged, the upper weldment 50 can be rotated relative to the lower weldment 36. This permits the main lever tube 34 of the control arm 24 to be folded or collapsed forward onto the frame 12 of the mower 10 (as shown in FIG. 3).

It should be noted that the outward force on the main lever tube 34 may be released once the locking ears 56 have been brought out of alignment with the notches 74 on the receiver flange 70. This is because the ends of the locking ears 56 will not inhibit the rotation of the upper weldment 50 while biased against the exterior face 72 of the receiver flange 70.

When the control arm 24 is in the folded or collapsed position, the operator can easily gain access to the operator's seat 20 on the mower 10. Once the operator is positioned on the operator's seat 20, then the control arm 24 can be returned to the engaged position. This is accomplished by rotating the main lever tube 34 to the upright position so as to align the locking ears 56 with the notches 74 on the receiver flange 70. When locking ears 56 are aligned with the notches 74, the spring 76 will push the locking ears 56 into notches 74.

The preferred embodiment utilizes a pair of locking ears 56 positioned on opposite sides of the upper weldment 50. The upper weldment 50 could, however, comprise any number of locking ears 56. For example, a single locking ear 56 could be used instead of the pair shown. In addition, the preferred embodiment utilizes a pair of notches 74 on the receiver flange 70 that coincide with the pair of locking ears 56 on the upper weldment 50. The receiver flange 70 could, however, include additional notches 74 so as to provide multiple locking positions. This would permit the control arm 24 to be locked in a variety of positions depending on the size of the operator.

It should be appreciated that the apparatus of the present invention is capable of being incorporated in the form of a variety of embodiments, only a few of which have been illustrated and described above. The invention may be embodied in other forms without departing from its spirit or essential characteristics. For example, the arrangement of locking ears 56 and the notches 74 could be reversed (i.e., the locking ears 56 could be located on the lower weldment 36), or different types of mechanical devices could be used to connect the upper weldment 50 to the lower weldment 36. The described embodiments are therefore considered in all respects only as illustrative and not restrictive, and the scope of the invention is, therefore, indicated by the appended claims rather than by the foregoing description. All modifications that come within the meaning and range of equivalency of the claims are to be embraced within their scope.

What is claimed is:

1. A foldable control arm for use with a riding mower, said riding mower comprising a frame, a mower deck suspended from said frame, an engine for supplying power to said riding mower, and a drive unit for propelling said riding mower, said drive unit being connected to said engine, wherein said foldable control arm is connected to said drive unit and is movable so as to control the motion of said riding mower, said foldable control arm comprising:

a) a main lever tube having a lower end and a grip portion;
   b) an upper weldment affixed to the lower end of said main lever tube, said upper weldment comprising an engaging element; and
   c) a lower weldment affixed to said drive unit and comprising a sleeve adapted to receive the lower end of said main lever tube, the lower end of said main lever tube extending through said sleeve, said lower weldment further comprising a receiving element affixed to an end of said sleeve and adapted to connect to said engaging element, wherein said engaging element is connected to said receiving element to prevent said main lever tube from rotating within said sleeve relative to said lower weldment, and wherein said engaging element is disconnected from said receiving element to permit said main lever tube to rotate within said sleeve relative to said lower weldment.

2. The foldable control arm of claim 1 wherein said engaging element comprises a plurality of ears projecting outwardly from said upper weldment and said receiving element comprises a plurality of notches.

3. The foldable control arm of claim 1 wherein the upper weldment is biased against the lower weldment by a spring.

4. The foldable control arm of claim 1 wherein the lower end of the main lever tube comprises a retaining member for securing said main lever tube within said sleeve.

5. The foldable control arm of claim 1 wherein the lower weldment further comprises a mounting tube connected to the drive unit on said riding mower, said mounting tube having a central axis that is substantially perpendicular to a central axis of the sleeve of the lower weldment.

6. A riding mower comprising a frame, a mower deck suspended from said frame, an engine for supplying power to said mower, drive unit for propelling said mower, and a pair of control arms for controlling said drive unit, wherein at least one of said control arms is foldable, said foldable control arm comprising:

a) a main lever tube having a lower end, an upright section and a grip portion, said upright section connecting said grip portion to said lower portion;

b) an upper weldment affixed to the lower end of said main lever tube, said upper weldment comprising a support flange and a plurality of outwardly projecting ears;

c) a lower weldment adapted to receive the lower end of said main lever tube, said lower weldment affixed to said drive unit, said lower weldment comprising a receiver flange having a plurality of notches, said notches configured so as to engage said outwardly projecting ears, wherein said main lever tube is prevented from rotating relative to said lower weldment when said outwardly projecting ears are engaged with said notches and said main lever tube is free to rotate relative to said lower weldment when said outwardly projecting ears are not engaged with said notches; and d) a spring connected to said lower weldment and said lower end of said main lever tube, said spring configured so as to bias said upper weldment against said lower weldment.

7. The riding mower of claim 6 wherein said plurality of outwardly projecting ears comprises two outwardly projecting ears positioned on opposite sides of said main lever tube.

8. The foldable control arm of claim 4 wherein the upper weldment is biased against the lower weldment by a spring, said spring being positioned between said retaining member and a lower end of said sleeve.

9. The riding mower of claim 6 wherein the lower weldment further comprises a mounting tube connected to the drive unit on said riding mower, said mounting tube having a central axis that is substantially perpendicular to a central axis of the lower end of said main lever tube.

* * * * *